(12) United States Patent
Van Dijk et al.

(10) Patent No.: US 8,243,453 B2
(45) Date of Patent: Aug. 14, 2012

(54) COOLING ARRANGEMENT FOR CONDUCTOR IN ELECTRICAL INSTALLATION

(75) Inventors: Marcel Berend Paul Van Dijk, Enschede (NL); Arend Jan Willem Lammers, Hengelo (NL); Gerard Cornelis Schoonenberg, Hengelo (NL); Frederik Paul Schoten, Nijverdal (NL); Johannes Josephus Gerardus Van Thiel, Holten (NL); Brad Robert Leccia, Bethel Park, PA (US)

(73) Assignee: Eaton Electric B.V., Hengelo (NL)

( * ) Notice: Subject to any disclaimer, the term of this patent is extended or adjusted under 35 U.S.C. 154(b) by 0 days.

(21) Appl. No.: 12/595,877

(22) PCT Filed: Apr. 16, 2008

(86) PCT No.: PCT/NL2008/050213
§ 371 (c)(1),
(2), (4) Date: Mar. 5, 2010

(87) PCT Pub. No.: WO2008/130228
PCT Pub. Date: Oct. 30, 2008

(65) Prior Publication Data
US 2010/0188819 A1    Jul. 29, 2010

(30) Foreign Application Priority Data

Apr. 18, 2007  (EP) ..................................... 07106389

(51) Int. Cl.
*H05K 7/20* (2006.01)
(52) U.S. Cl. ........ 361/713; 361/676; 361/709; 361/712; 361/831; 218/120; 218/140; 218/154; 439/210
(58) Field of Classification Search .................. 361/604, 361/605, 611, 619, 632, 634, 637, 641, 647–648, 361/652, 673, 676, 679.54, 688, 704, 707, 361/709, 710, 712, 713, 831
See application file for complete search history.

(56) References Cited

U.S. PATENT DOCUMENTS

| | | | | |
|---|---|---|---|---|
| 5,600,099 A | * | 2/1997 | Crotzer et al. | 174/257 |
| 7,848,084 B2 | * | 12/2010 | Hama et al. | 361/619 |
| 2001/0002666 A1 | * | 6/2001 | Ito et al. | 218/134 |
| 2005/0007742 A1 | | 1/2005 | Pleines et al. | |
| 2006/0102618 A1 | | 5/2006 | Lakner et al. | |
| 2009/0147454 A1 | * | 6/2009 | Wang et al. | 361/679.5 |

FOREIGN PATENT DOCUMENTS

DE        199 37 072 A1    2/2001
* cited by examiner

*Primary Examiner* — Courtney Smith
(74) *Attorney, Agent, or Firm* — Eckert Seamans Cherin & Mellott, LLC; Kirk D. Houser

(57) ABSTRACT

Cooling arrangement for an electrically conductive element in an electrical installation. A casting body (3) is provided for electrically isolating the electrically conductive element (2). The casting body has an outer wall, part of which forms a contact surface 5 (5) for contact with a heat conducting surface (1) of the electrical installation. The outer wall of the casting body (3) is provided with an electrically conductive layer (4; 7) at its outer surface.

18 Claims, 2 Drawing Sheets

COOLING ARRANGEMENT FOR CONDUCTOR IN ELECTRICAL INSTALLATION

FIELD OF THE INVENTION

Figure 1:
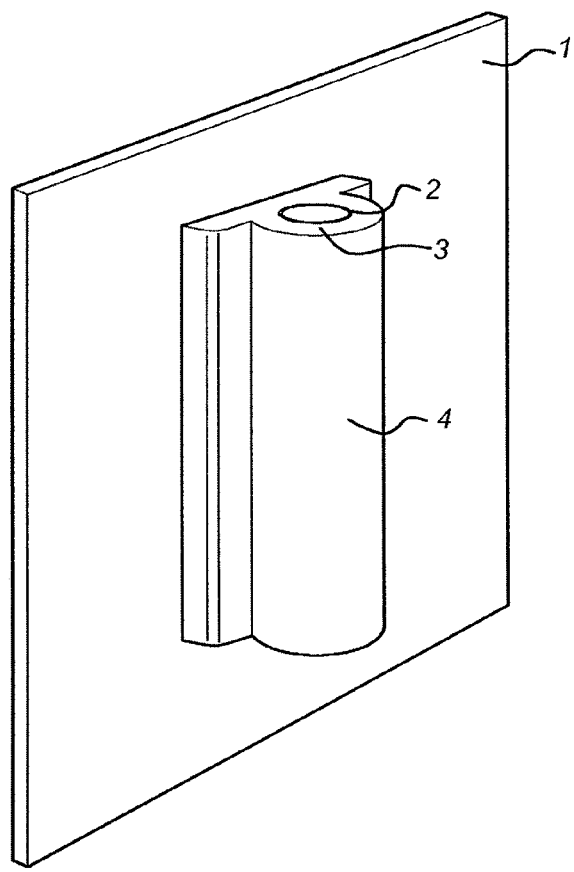

The present invention relates to a cooling arrangement for an electrically conductive element in an electrical installation, the cooling arrangement comprising a casting body for electrically isolating the electrically conductive element, in which the casting body has an outer wall, part of which forms a contact surface for contact with a heat conducting surface of the electrical installation The casting body also functions as a constructing part. In a further aspect, the present invention relates to an electrical installation with such a cooling arrangement.

PRIOR ART

German patent application DE-A-199 37 072 describes a connecting element in a medium voltage switch, in which the connecting element is isolated using a sheathing of isolating material (heat conducting resin), around which cooling elements in the form of convector ribs are positioned to provide cooling of the connecting element.

American patent application US2005/0007742 discloses a high-power switchgear with a cooling rib arrangement provided in an outer conductor which surrounds an inner conductor in a co-axial manner. The cooling ribs extend both towards the inner conductor and to the outside environment to provide cooling of the inner conductor. In American patent application US2006/0102618, the inner conductor is connected to a cooling rib arrangement on the outer conductor using a heat pipe arrangement to transfer thermal energy.

American patent application US2001/002666 discloses a switch gear using vacuum valves. The entirety of vacuum valves and connecting elements is encased in a resin en bloc. Fins (of resin material or metal) and or heat pipes are included in the en bloc moulding, to allow efficient heat transfer.

SUMMARY OF THE INVENTION

The present invention seeks to provide an improvement in the thermal management of electrical installations, specifically by improving heat extraction from the conductive elements in the electrical installation.

According to the present invention, a cooling arrangement according to the preamble defined above is provided, in which the outer wall of the casting body is provided with an electrically conductive layer, e.g. near or at its outer surface. Using a flush mounting allows to transfer thermal energy from the electrically conductive element to the heat conducting surface of the electrical installation. The heat conducting surface can then be cooled by heat dissipation, heat radiation or other types of thermal cooling methods. The electrically conductive layer provides shielding of the outside world for electric fields, allowing to position the conductive element and casting body closer to other conductive parts of the electrical installation without chances of partial discharges, etc.

In a further embodiment, the casting body is mounted to the heat conducting surface using a thermal conductive paste. This allows an even better heat transfer.

The electrically conductive layer is, in a further embodiment, formed by a thermal and electrically conductive paste with which the casting body is mounted to the heat conducting surface. This allows to implement both the thermal conductive property and the electrically conductive property using only a single element.

The electrically conductive layer may be grounded to provide the shielding functionality efficiently.

The electrically conductive layer may be a metal layer included in the casting process of the casting body, or it may be provided on the outside surface of the casting body, e.g. using gluing or deposition techniques. The layer may be a solid layer, or a meshed layer with very small openings, such as a braided layer.

In a further embodiment, the electrically conductive element is made of a heat conducting material, such as a metal, e.g. copper or other electrically conductive alloy. The electrically conductive element is then also capable to conduct heat away from hot spots in the installation, enabling a very efficient cooling of the electrical installation.

The casting body is in a further embodiment made of a heat conducting material. This allows for an efficient transfer of heat away from the conductive element.

The contact surface of the casting body is a flat surface in an even further embodiment. Such a flat surface enables a good heat transfer to the heat conducting surface, and is easy to manufacture.

In a further embodiment, the casting body is provided with a contact surface extending in a direction substantially parallel to a longitudinal axis of the electrically conductive element. In other words, the surface is provided at a small, substantially equal distance from the electrically conductive element over a predetermined length of the conductive element, thus providing a good heat conductor from the electrically and thermally conductive element to the heat conducting surface.

In a further aspect, the present invention relates to an electrical installation comprising a electrically conductive element and a cooling arrangement for the electrically conductive element, the cooling arrangement comprising a casting body for electrically isolating the electrically conductive element, in which the casting body has an outer wall, part of which forms a contact surface that is form-fitted with at least a part of a heat conducting surface of the electrical installation, and in which the outer wall of the casting body is provided with an electrically conductive layer, e.g. near or at its outer surface.

In a further embodiment, an electrical installation is provided with a cooling arrangement according to one of the embodiments described above, in which the heat conducting surface is a back wall of the electrical installation. An electrical connection between the electrically conductive layer and the heat conducting surface may be formed directly when connecting the casting body to the surface. The heat conducting surface can be cooled by heat dissipation, heat radiation or other types of thermal cooling methods. The back wall of an installation is usually positioned in free air, allowing cooling by radiation and/or convection.

SHORT DESCRIPTION OF DRAWINGS

Figure 2:
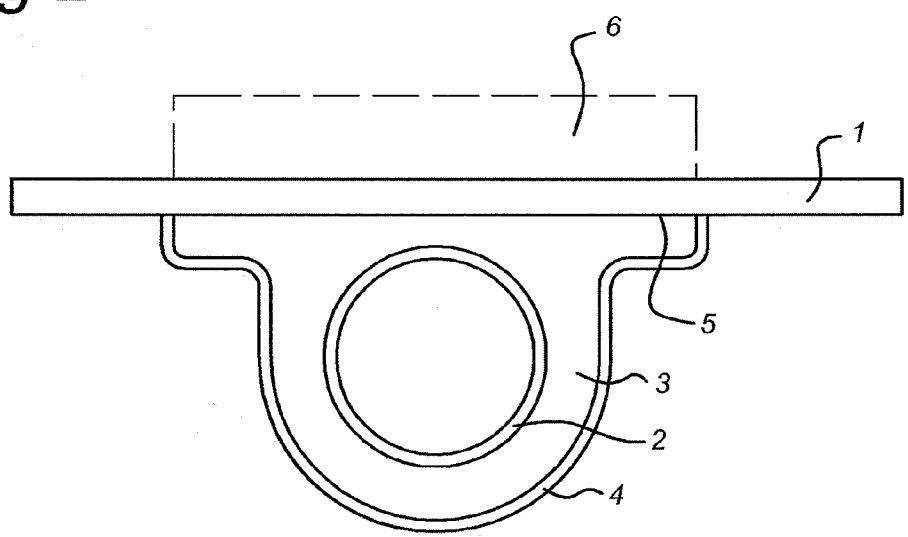
Figure 3:
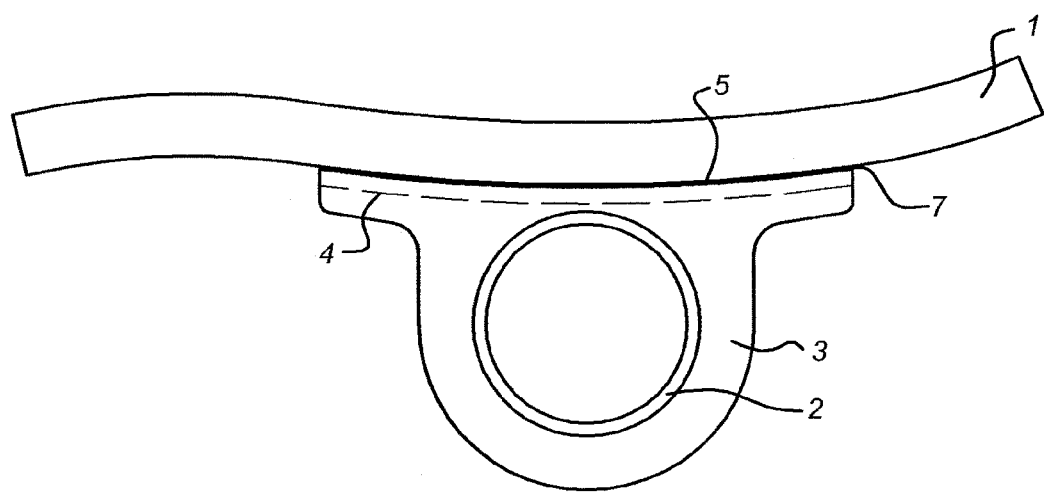

The present invention will be discussed in more detail below, using a number of exemplary embodiments, with reference to the attached drawings, in which FIG. 1 shows a perspective view of a cooling arrangement in a switchgear installation according to an embodiment of the present invention;

FIG. 2 shows a cross sectional view of a further embodiment according to the present invention; and FIG. 3 shows a cross sectional view of an even further embodiment of the cooling arrangement according to the present invention.

DETAILED DESCRIPTION OF EXEMPLARY EMBODIMENTS

The present invention, a cooling arrangement for a conductor in an electrical installation, will be described below referring to the embodiments as shown in the attached drawings. The cooling arrangement may be applied in medium voltage switchgear installations. In these switchgear installations, heat is generated during operation in a number of localized positions, such as at connections of conductors to a circuit breaker or switch. The locally generated heat however, is also transferred in the installation through the conductors, which are generally also good thermal conductors. The present invention aims to extract more thermal heat out of the (usually copper or aluminum) conductors than is possible using known installation structures.

In FIG. 1, a perspective view is shown of a part of an electrically conductive element or conductor 2 located close to a wall 1 of the switchgear installation, e.g. a back wall 1. The walls of a switchgear installation are usually made of a metal, which allows using the wall 1 as a heat conductive surface, e.g. as heat dissipater or heat radiator to the environment. Using the back wall 1 of the switchgear installation has the advantage that it is unlikely that personnel will be able to come into contact with the warmed up regions of the wall 1.

The conductor 2 is e.g. made of a hollow copper tube, and is a good thermal conductor. In the embodiments shown, the conductor 2 is a circular tube, but other cross sectional alternatives are possible, such as square, elliptical, or flat tubes or solid rods. Also other materials may be used, which are sufficiently electrically conductive, such as aluminum or metal alloys.

The conductor 2 is surrounded by an isolating layer or casting body 3, e.g. made of a thermally conductive resin material. The casting body 3 is formed to allow a flush mounting of the casting body 3 with the (metal) wall 1 of the switchgear installation.

FIG. 2 shows a cross sectional view of the arrangement of FIG. 1, which shows that the casting body 3 is formed to have a contact surface 5 with the wall 1, which extends in a direction substantially perpendicular to a longitudinal axis of the conductor 2 to allow as large a contact surface 5 as possible. In a further embodiment, conduction of thermal energy from the casting body 3 to the wall 1 is enhanced using a suitable agent, e.g. a thermal paste. In this manner, a casting body 3 is formed to be used as part of the cooling arrangement for a conductor 2 in an electrical installation having heat sink properties.

To be able to place the combination of conductor 2 and casting body 3 against the wall 1, the electrical field around the conductor 2 has to be controlled. In the embodiment shown in FIG. 1, this is accomplished using an electrically conductive layer 4 on the surface of the casting body 3. The electrically conductive layer 4 can be provided on the surface of the casting body 3 which will not contact the wall 1 only, and optionally an electrical contact with a grounding point may be made in a manner known to the skilled person to bring the electrically conductive layer 4 on earth or ground potential. In a further embodiment the electrically conductive layer 4 surrounds the entire outer surface of the casting body 3, and a contact with a ground potential point may be made by the mounting to the wall 1 (which is usually earthed). The electrically conductive layer 4 may comprise a metal layer which is inserted in the casting body 3 during the manufacture thereof, e.g. a flexible braided layer. Alternatively, the electrically conductive layer 4 is attached to the outside of the casting body 3, e.g. using a glue or deposition process.

To further enhance the cooling capacity of the arrangement of conductor 2, casting body 3, and wall 1, additional cooling elements, e.g. cooling ribs 6 (shown in a dashed outline in FIG. 2) may be positioned on the outside surface of the wall 1 in a manner known as such.

In FIG. 3 a cross sectional view is shown of a further embodiment of the cooling arrangement according to the present invention. In this case, it is shown that the wall 1 has not a flat but a curved surface. In that case, the casting body 3 is provided with also a curved contact surface 5 that form-fits with the surface of the wall 1 of the electrical installation. In other words, the contact surface 5 follows the local contours of the wall 1 to which the casting body 3 is mounted (i.e. forms a locally congruent surface with the wall 1).

The casting body 3 can be attached to the wall 1 using a electrically conductive layer between the contact surface 5 of the casting body 3 and the wall 1 of the installation, but in a further advantageous embodiment as shown in FIG. 3, a thermal and electrically conductive paste 7 is used to mount the casting body 3 to the wall 1. Advantageously, this thermal and electrically conductive paste 7 fulfills the function of the electrically conductive layer 4 and provides a shielding of the area on the opposite side of the wall 1 at the same time.

Instead of providing the electrically conductive layer 4 on the outside surface of the casting body, e.g. using gluing or deposition techniques, it may also be provided inside the casting body 3, e.g. by including a conducting layer during the casting process of the casting body 3 (indicated by dashes). The electrically conductive layer 4 may again be in the form of a metal plate of solid material, of a mesh material or in the form of a braided material.

The casting body 3 is provided with an electrically conductive layer 4, 7, which is covering at least a part of the contact surface 5, in order to provide an efficient electrical field shielding towards an area at the opposite side of the wall 1.

Furthermore, as in the embodiments described above, the electrically conductive layer 4 or the thermal and electrically conducting paste 7 is grounded to provide an even more efficient electrical shielding.

The invention claimed is:

1. An electrical installation comprising a circuit breaker, a plurality of connections of conductors to said circuit breaker, a plurality of walls, an electrically conductive element and a cooling arrangement for the electrically conductive element in the electrical installation, the cooling arrangement comprising a casting body for electrically isolating the electrically conductive element, in which the casting body has a central portion surrounding the electrically conductive element and an outer wall, part of which forms a non-flat contact surface that is form-fitted with at least a part of a heat conducting wall of the electrical installation, in which the outer wall of the casting body is provided with an electrically conductive layer, in which the heat conducting wall is a back wall of the plurality of walls of the electrical installation, and in which the electrically conductive layer is parallel to and abuts the back wall at the non-flat contact surface and extends beyond the central portion of the casting body.

2. The electrical installation according to claim 1, in which the casting body is mounted to the heat conducting wall using a thermal conductive paste.

3. The electrical installation according to claim 1, in which the electrically conductive layer is formed by a thermal and electrically conductive paste with which the casting body is mounted to the heat conducting wall.

4. The electrical installation according to claim 1, in which the electrically conductive layer is grounded.

5. The electrical installation according to claim 1, in which the electrically conductive layer is a metal layer included in the casting body.

6. The electrical installation according to claim 1, in which the electrically conductive element is made of a heat conducting material.

7. The electrical installation according to claim 1, in which the casting body is made of a heat conducting material.

8. A switchgear installation comprising a circuit breaker, a plurality of connections of conductors to said circuit breaker, a plurality of walls, an electrically conductive element and a cooling arrangement for the electrically conductive element in the switchgear installation, the cooling arrangement comprising a casting body for electrically isolating the electrically conductive element, in which the casting body has a central portion surrounding the electrically conductive element and an outer wall, part of which forms a contact surface contacting a heat conducting surface of the switchgear installation, in which the outer wall of the casting body is provided with an electrically conductive layer, in which the heat conducting surface is a back wall of the plurality of walls of the switchgear installation, and in which the electrically conductive layer is parallel to and abuts the back wall at the contact surface and extends beyond the central portion of the casting body.

9. The switchgear installation according to claim 8, in which the casting body is mounted to the heat conducting surface using a thermal conductive paste.

10. The switchgear installation according to claim 8, in which the electrically conductive layer is formed by a thermal and electrically conductive paste with which the casting body is mounted to the heat conducting surface.

11. The switchgear installation according to claim 8, in which the electrically conductive layer is grounded.

12. The switchgear installation according to claim 8, in which the electrically conductive layer is a metal layer included in the casting body.

13. The switchgear installation according to claim 8, in which the electrically conductive element is made of a heat conducting material.

14. The switchgear installation according to claim 8, in which the casting body is made of a heat conducting material.

15. The switchgear installation according to claim 8, in which the contact surface of the casting body is a flat surface.

16. The switchgear installation according to claim 8, in which the casting body is provided with the contact surface extending in a direction substantially parallel to a longitudinal axis of the electrically conductive element.

17. The switchgear installation according to claim 8 wherein said back wall has a flat surface; and wherein said contact surface is a flat contact surface.

18. The switchgear installation according to claim 8 wherein said back wall has a curved surface; and wherein said contact surface is a curved contact surface.

\* \* \* \* \*